US009356942B1

(12) United States Patent
Joffe (10) Patent No.: US 9,356,942 B1
(45) Date of Patent: May 31, 2016

(54) METHOD AND SYSTEM FOR DETECTING NETWORK COMPROMISE

(71) Applicant: Neustar, Inc., Sterling, VA (US)

(72) Inventor: Rodney L. Joffe, Sterling, VA (US)

(73) Assignee: Neustar, Inc., Sterling, VA (US)

( * ) Notice: Subject to any disclaimer, the term of this patent is extended or adjusted under 35 U.S.C. 154(b) by 119 days.

(21) Appl. No.: 13/784,710

(22) Filed: Mar. 4, 2013

Related U.S. Application Data

(60) Provisional application No. 61/606,956, filed on Mar. 5, 2012.

(51) Int. Cl.
*G06F 11/00* (2006.01)
*G06F 12/14* (2006.01)
*G06F 12/16* (2006.01)
*H04L 29/06* (2006.01)
*G06F 21/00* (2013.01)
*H04W 12/00* (2009.01)
*H04L 29/12* (2006.01)

(52) U.S. Cl.
CPC ........ *H04L 63/1408* (2013.01); *H04L 63/1441* (2013.01); *H04L 63/1491* (2013.01); *G06F 12/14* (2013.01); *G06F 21/00* (2013.01); *H04L 61/1511* (2013.01); *H04L 63/02* (2013.01); *H04L 63/0263* (2013.01); *H04L 63/10* (2013.01); *H04L 63/14* (2013.01); *H04W 12/00* (2013.01)

(58) Field of Classification Search
CPC ..... H04L 63/14; H04L 63/1491; H04L 63/10; H04L 63/1408; H04L 63/1441; H04L 63/02; H04L 63/0263; H04L 61/1511; G06F 12/14; G06F 21/00; H04W 12/00

USPC ................................................ 726/22–25, 27
See application file for complete search history.

(56) References Cited

U.S. PATENT DOCUMENTS

| | | | | |
|---|---|---|---|---|
| 8,561,187 B1* | 10/2013 | Hegil | ................... | H04L 63/1491 726/22 |
| 8,726,379 B1* | 5/2014 | Stiansen | ............. | H04L 63/1491 726/22 |
| 8,819,825 B2* | 8/2014 | Keromytis et al. | ............. | 726/24 |
| 9,027,135 B1* | 5/2015 | Aziz | ................... | H04L 63/1408 726/23 |
| 2004/0172557 A1* | 9/2004 | Nakae et al. | ................... | 713/201 |
| 2006/0101516 A1* | 5/2006 | Sudaharan | .......... | H04L 63/0263 726/23 |
| 2008/0028463 A1* | 1/2008 | Dagon | ............. | H04L 29/12066 726/22 |

(Continued)

OTHER PUBLICATIONS

Automatic detection and banning of content stealing bots for e-commerce, N Poggi, JL Berral, T Moreno, R Gavalda, NIPS 2007 workshop, cs.upc.edu, 2007.*

*Primary Examiner* — Jayesh Jhaveri
(74) *Attorney, Agent, or Firm* — Perkins Coie LLP (57) ABSTRACT

A method and system are described for detecting unauthorized access to one or more of a plurality of networked victim computers in a victim cloud. The networked victim computers connect to one or more DNS servers. The system includes one or more decoy bot computers, which are operated as victim computers in the victim cloud. The system also includes one or more decoy control computers, which are operated as control computers that communicate with victim computers in the victim cloud. Threats are identified by analyzing data traffic communicated with the decoy bot computers and decoy control computers for information suspected of having being sent from a victim's computer without proper authorization, and by monitoring whether behavior of a DNS server deviates from expected behaviors.

16 Claims, 7 Drawing Sheets

(56) References Cited

U.S. PATENT DOCUMENTS

| | | |
|---|---|---|
| 2008/0163354 A1 | 7/2008 | Ben-Shalom et al. |
| 2009/0119778 A1* | 5/2009 | Bhuyan .................. G06F 9/441 726/25 |
| 2010/0325685 A1 | 12/2010 | Sanbower |
| 2011/0167494 A1* | 7/2011 | Bowen et al. ................... 726/24 |
| 2012/0042381 A1* | 2/2012 | Antonakakis ....... H04L 63/1483 726/22 |
| 2013/0133072 A1* | 5/2013 | Kraitsman et al. .............. 726/23 |
| 2015/0326588 A1* | 11/2015 | Vissamsetty ............ H04L 63/14 726/23 |

* cited by examiner

METHOD AND SYSTEM FOR DETECTING NETWORK COMPROMISE

RELATED APPLICATIONS

This application claims priority to U.S. Provisional Patent Application No. 61/606,956, entitled "Method And Apparatus For Detecting Network Compromise," filed on Mar. 5, 2012, the contents of which are incorporated by reference in its entirety for all purposes.

FIELD OF THE INVENTION

The present invention relates to computer networking, and more particularly, to a system and method that improves network security by aggregating security threat indicators from a plurality of sources and analyzing the threat indicators as a synergistic combination.

DISCUSSION OF THE RELATED ART

The Internet is a collection of countless computer networks and computing devices around the globe. Businesses and individuals rely on the Internet to communicate sensitive data, such as confidential business data and other financial information such as banking information, credit card account information, etc. All electronic communication transmitted on the Internet, however, is subject to the possibility of compromise. Even data located in secured networks are susceptible to attack. Notwithstanding the development of remote access techniques and procedures that require the transmission of log-in credentials such as a username and password, log-in information and secure networks can be infiltrated. Hackers launch malicious attacks that exploit security vulnerabilities with the aim of also exploiting the data they steal. Accordingly, the need to secure computing devices and networks is paramount.

As hackers launch new attacks, security providers develop counterattacks. For example, when a new virus is launched, anti-virus software is updated promptly. Nonetheless, dangers exist before the virus has been discovered and before countermeasures are put into place. This is known as a zero-day attack.

A variety of network security elements may be used for protecting networks and individual devices from unauthorized access. Traditional security mechanisms use various hardware and software components including firewalls, anti-virus software, network access control systems, expert systems, intrusion detection systems (IDS), intrusion prevention systems (IPS), etc. An IDS, which may be a pattern matching system or an anomaly detection system, monitors network traffic to identify suspicious activities. An IPS has similar capabilities compared to an IDS, but it can also take remedial action.

A firewall is a type of IDS, but with limited effectiveness. A firewall typically is placed between an Internet connection and a network server to intercept malware prior to entering the network. Hackers have developed mechanisms to circumvent firewalls, such as deceptive packets, that can be used to relay malware into the network despite the presence of a firewall. A firewall is also not effective against an internal hacker.

Conventional security components endeavor to protect individual computing and networking devices. But by operating in isolation, these components do not account for threats being addressed by other security components, and are also ineffective against zero-day attacks.

To carry out an attack, one or more hackers promulgate malicious software for disrupting computer operation, stealing sensitive information, and/or obtaining unauthorized access to computer networks. Malware, which can be in the form of a virus, worm, or Trojan, is an automated software program that causes a computer to act on behalf of a hacker. Without the owner's consent, the malware infects a computer and uses the computer to infect additional computers. An infected computer is known as a "robot" or "bot" that acts as an agent of the hacker who controls the bot. A botnet is a plurality of bots under the control of a hacker. Botnets include several compromised computers that can be used by a hacker to carry out an attack. A botnet acts as network infrastructure for a hacker.

Figure 1:
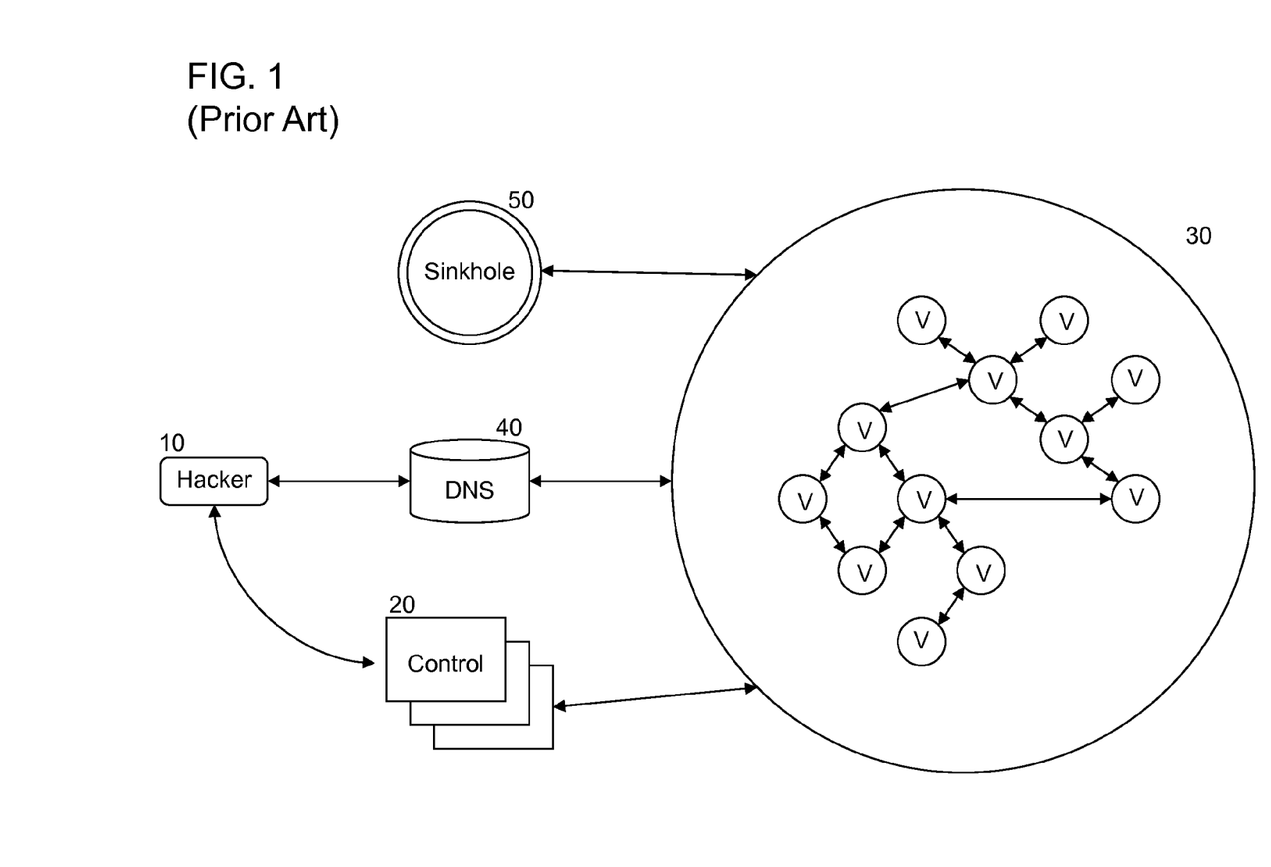
FIG. 1 is a system diagram that illustrates a known system for disrupting a botnet.

FIG. 1 is a system diagram that illustrates a known system with components for disrupting a botnet. As will be understood, a botnet can be disrupted by a DNS service provider outside of a typical network environment. FIG. 1 depicts an arrangement including one or more hackers 10, one or more control computers 20, a victim cloud of bot computers 30, one or more Domain Name System (DNS) or Dynamic Domain Name System (DDNS) servers 40, and one or more sinkhole computers 50.

After becoming infected by malware, the compromised computers in victim cloud 30 become controlled by a hacker's control computer 20. Compromised computers in victim cloud 30 communicate with the control computer 20 either directly or indirectly through other compromised computers. The hacker's control computer 20 acts as a proxy computer between the hacker 10 and the bot computers "V" (for "victim" computer). The bot computers V may be individual computers connected to the Internet through an Internet Service Provider. Alternatively, the bot computers V may be connected to the Internet through a local network, such as a corporate network. The hacker 10 uses its proxy control computer 20 to observe connections in the victim cloud 30, update malware, and steal information from bot computers "V".

Once a botnet is identified, a DNS service provider can modify a lookup table in the DNS or DDNS server 40 such that the IP address of the hacker's control computer 20 is replaced with the IP address of the sinkhole computer 50. As a result, traffic from at least some of the compromised computers in victim cloud 30 is redirected to the sinkhole computer 50. A sinkhole computer is a computer or server used to direct malicious traffic away from an intended recipient (i.e., a hacker). As traffic is directed to the sinkhole computer 50, an anti-virus software provider can analyze the traffic in an effort to develop a countermeasure to the malware.

Existing security mechanisms, such as the botnet disruption system described with reference to FIG. 1, are defensive in nature. As attacks emerge, countermeasures are developed, but so long as new threats appear and zero days exist, loss of sensitive information can occur. Furthermore, existing security mechanisms tend to act in isolation, instead of analyzing information of several security mechanisms in combination to better understand a network attack. A better understanding of the malware can be obtained by analyzing data obtained from a plurality of security mechanisms. Accordingly, an improved approach is desirable to quickly identify and mitigate breaches to existing security mechanisms that will inevitably occur.

SUMMARY OF THE INVENTION

Accordingly, the present invention is directed to an improved method and apparatus for detecting network compromise that substantially obviates one or more problems due to limitations and disadvantages of the related art.

The present invention relates to a system and method for securing computing devices and computer networks. In addition, the present invention relates to a system and method for securing computing devices and networks by aggregating security threat indicators from a plurality of sources such that threat indicators are analyzed in combination.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the present invention, examples of which are illustrated in the accompanying drawings. Wherever possible, like reference numbers will be used for like elements.

As discussed above, known security techniques are generally directed to the prevention of attacks and the maintenance of existing security measures. But as new attacks continue to emerge, zero-day attacks are often inadequately addressed by conventional security measures. By contrast to existing security measures, the present invention assumes that new threats will continue to emerge and that loss will occur. Accordingly, an aspect of the present invention is directed to a system and method that mitigates the risk of loss posed by new threats.

Figure 2:
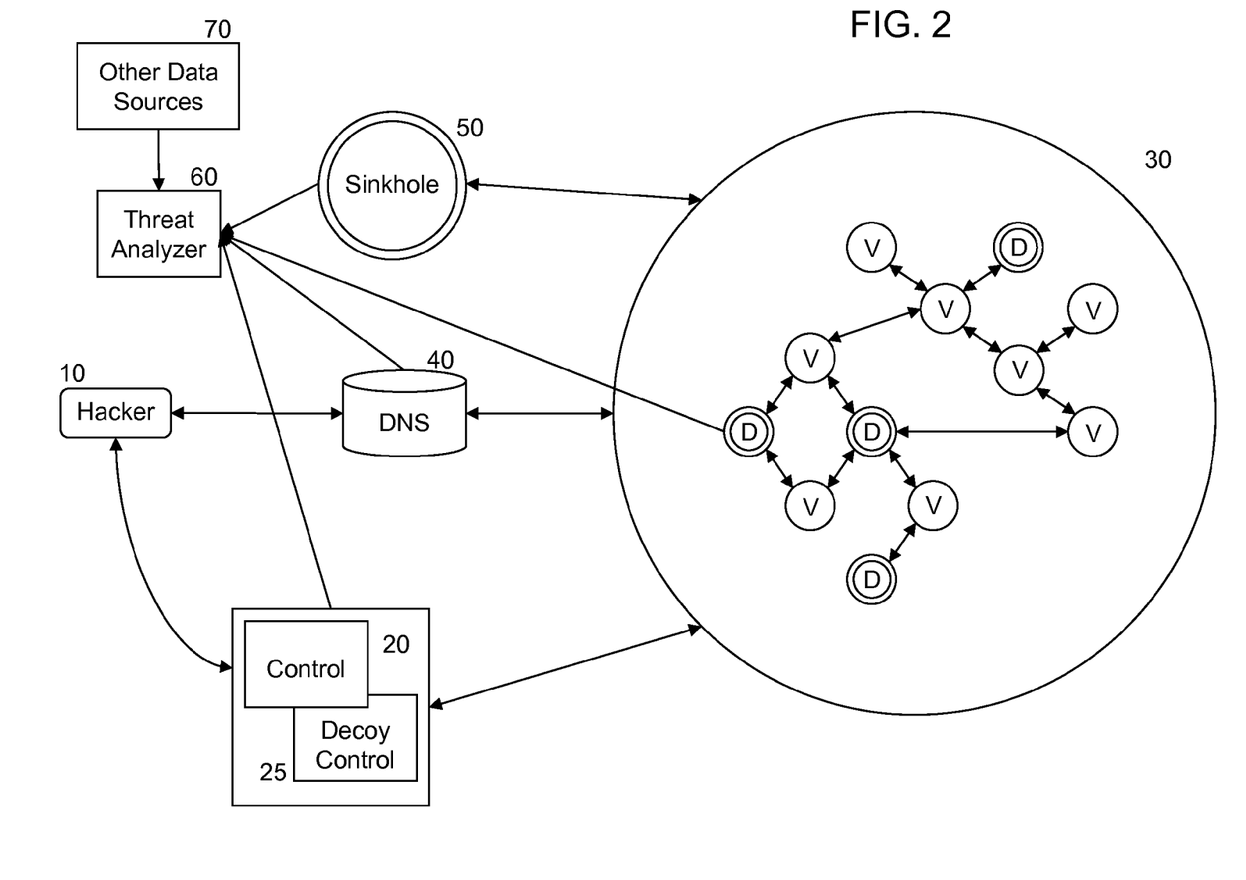
FIG. 2 is an exemplary system diagram that illustrates a system that can be used to detect network compromise according to an embodiment of the present invention.

FIG. 2 is an exemplary system diagram that illustrates a system with an arrangement of components that can detect network compromise according to an embodiment of the present invention. As shown in FIG. 2, the present invention builds upon the known system for detecting a botnet by introducing a threat analyzer 60 that gathers threat data from several sources for analysis in combination. In addition to analyzing threat data, the threat analyzer 60 also intercepts stolen information en route to hacker 10. Stolen information can be retrieved from the decoy control computers 25 as well as the decoy victim computers V that are also introduced in FIG. 2. The owner of the stolen information can then be notified that a security breach has occurred so that remedial measures can be taken.

Similar to FIG. 1, FIG. 2 illustrates one or more hackers 10, one or more hacker control computers 20, a victim cloud of bot computers 30, one or more Domain Name System (DNS) or Dynamic Domain Name System (DDNS) servers 40, one or more sinkhole computers 50. FIG. 2 additionally connects one or more decoy victim computers V, one or more decoy control computers 25, and a threat analyzer 60.

Hackers 10 may promulgate malware via several means. Some common methods used by hackers 10 include spam e-mail, websites, pop-up ads, 3rd party applications to social networking sites, storage mediums (e.g., USB drives), etc. Once a computer is infected, the infected computer can seek to infect other computers and devices with which it communicates.

In light of the ubiquitous nature of the means used to distribute malware, the number of infected computers can grow exponentially. Collectively, the infected computers in victim cloud 30 and control computer 20 form a botnet. As described with reference to FIG. 1, after being infected by malware, the computers in victim cloud 30 are no longer under the complete control of their owners, but rather each infected computer is now controlled remotely by the hacker 10 through hacker control computer 20. Thus, infected computers are said to be compromised because the hacker 10 is now capable of disrupting the computer's operation and stealing sensitive information that is stored on the infected computers. Compromised computers in victim cloud 30 communicate with the control computer 20 either directly or indirectly through other compromised computers. The hacker control computer 20 acts as a proxy computer between the hacker 10 and the bot computers "V". The hacker 10 uses the proxy control computer 20 to observe connections in the victim cloud 30, update malware, and steal information from bot computers V.

Information sought by hackers 10 may include, for example, stolen credentials such as user names and passwords for corporate networks, bank account information, and credit card information. Hackers may also seek strategic corporate data and information relating to national security. Intellectual property, such as strategic plans, new product launches, research and development information, customer lists and data, etc., may also be sought by hackers.

As shown in FIG. 2, to locate stolen information, the system for disrupting a botnet may include decoy devices. In particular, one or more decoy control computers 25 and one or more decoy victims "D" may be used. The system may additionally include sinkhole computer 50.

A decoy device is a computer or server that appears to be an ordinary network device, but instead is controlled by a security provider. In hopes of attracting a hacker 10, a security provider establishes a computer or server that has high data bandwidth, high data storage, and is continuously available. The purpose of the decoy control computer 25 is to attract a hacker 10 to use it as a control computer 20. Similarly, the purpose of the decoy bot computer D is to attract a hacker 10 to use the decoy as a bot. As no other traffic is being routed to and from the decoy devices, traffic routed through the decoy devices is very likely to be malicious. Accordingly, traffic routed through the decoy devices is subjected to packet inspection to locate stolen information. Packet inspection may be performed at the decoy devices. Alternatively, the data traffic of the decoy devices may be stored and packet inspection may be performed at the threat analyzer 60. In either case, if stolen data is located, the rightful owner is identified and alerted. For example, if Company ABC is a customer of the security provider, and the name of company ABC is located within the data traffic of the decoy computer, then an alert is generated. Once the extent of the breach is determined, Company ABC can undertake remedial action.

The use of decoy devices also enables a security provider to gather data about the hacker 10 and the malware being used. Traffic of the decoy devices can be analyzed to locate stolen data that is intercepted prior to reaching the hacker 10. In this manner, stolen data can be retrieved without the use of a sinkhole 50 (as described below). In addition, the decoy control computer 25 can maintain communication with the hacker such that stolen data is removed from the communications with the hacker 10. In yet another alternative, the false stolen data may be inserted into communications with the hacker 10.

One or more hacker control computers 20 may be used by hacker 10. For the sake of redundancy, hackers 10 may utilize multiple control computers 20. Otherwise, a single abuse report by a DNS service provider may terminate the control computer 20 and render the botnet inoperable. Hackers 10 may also prefer to use a DDNS server, instead of a DNS server, to frequently change the location of the control computers 20. A DDNS server 40 is a domain name resolution service that can be updated frequently. By using a plurality of control computers 20 and/or a DDNS server 40, the botnet remains resilient against attempts to terminate it by the authorities.

After acquiring one or more domain names, the hacker 10 may encode the acquired domain names into malware that is distributed to compromised computers in the victim cloud 30. To elude authorities, the hacker 10 may purchase the domain names with a stolen account. The DNS or DDNS server 40 is then used to translate the domain name into an IP address which corresponds to the location of the control computer 20. The victim bot computers will then contact the DNS or DDNS server 40 and be routed to the control computer 20. As the control computer 20 is responsible for coordinating the compromised computers within the victim cloud 30, the reliability of the control computer 20 is essential to the operation of the botnet. Accordingly, hacker 10 will utilize a reliable and high capacity server as a control computer 20. Again, a decoy control computer 25 appears as an ordinary high capacity computer to the hacker 10.

If a control computer 20 is identified by a DNS service provider as suspicious, the DNS or DDNS server 40 is shut down. When a DNS or DDNS server 40 becomes inoperable, the hacker seeks to re-establish another DNS or DDNS server 40. The request rate of a domain name or subdomain name can be used for determining that a control computer 20 is suspicious. For example, if the request rate increases exponentially, or if the request rate periodically spikes, the domain name or subdomain name may be identified as suspicious. The request rate of a particular domain and other data is collected by the DNS or DNS server 40. The DNS data is then relayed to a security provider where it can be analyzed by the threat analyzer 60.

Blacklists, which are freely available to the public, list IP addresses that have been identified as botnet control computers. A security provider or network administrator may employ these publicly available blacklists to create access control lists that prevent devices on their networks from communicating with these known botnet control computers.

A sinkhole computer 50 may also include a packet inspector that examines incoming data traffic. As the compromised computers become disconnected from the control computer 20, the compromised computers are then disconnected from the hacker 10 as well. Instead, the compromised computers become connected to sinkhole computer 50. As no other traffic is being routed to the sinkhole computer 50, traffic routed to the sinkhole computer 50 is very likely to be malicious. Accordingly, traffic routed through the sinkhole computer 50 is subjected to packet inspection to locate stolen information. In addition, the data gathered by the sinkhole computer can be analyzed in combination with data gathered from one or more other data sources.

Although compromised computers are disconnected from the control computer 20, the malware continues to operate on the compromised computers. Accordingly, remedial action, such as the application of anti-virus software, is still necessary to remove the malware from each bot computer V.

The threat analyzer 60 gathers and analyzes data from multiple sources, which may include decoy bot computers D, decoy control computers 25, sinkhole computers 50, DNS or DDNS servers 40, and other data sources (as described below), to identify evidence of an attack.

Unlike intrusion prevention systems, threat analyzer 60 identifies stolen data and other indicia that result from an attack that already occurred. For example, the threat analyzer 60 looks for stolen information within the decoy devices of the botnet. When stolen information is located, the information itself is proof that an attack already occurred. Once stolen data is identified, remedial action can be taken to prevent the exploitation of the stolen data.

In addition to identification of stolen information, other external markers of an attack may include cache poisoning of DNS or DDNS servers 40, the hijack of network route announcements, information in captured malware, IP addresses that seem to move physically, contact by systems with darknets, appearance of credentials or intellectual property in the "underground economy" (e.g., hacker chatrooms).

Data gathered at decoy victim computers D, a decoy control computer 25, and a sinkhole 50 are analyzed in combination to dissect the malware used in an attack. In addition to identifying the origin (e.g., a victim computer) and content of the malicious traffic, the threat analyzer 60 can also perform conventional network behavior analyses of the malicious data including netflow analysis, anomaly detection, and signature correlation. A netflow analyzer is a bandwidth monitoring tool that identifies which users within a network consume bandwidth and for what purpose. In addition to identifying bandwidth traffic patterns, network bandwidth may also be analyzed in real time. Similarly, anomaly detection devices determine bandwidth traffic patterns, but also generate an alert when bandwidth traffic deviates from the expected bandwidth pattern. Signature correlation techniques expand upon anomaly detection systems by comparing bandwidth traffic to a library of signatures corresponding to bandwidth traffic patterns of known attacks. When the bandwidth traffic pattern of a network matches an attack pattern within the signature library, an attack alert is generated.

In addition, the threat analyzer 60 introduces behavioral analysis techniques to identify malicious traffic, especially traffic associated with zero-day attacks. As will be discussed in detail with reference to FIG. 5, behavioral analysis techniques analyze data from the plurality of data sources to establish expected behaviors of individual devices, and identify deviations from the expected behaviors.

Figure 3A:
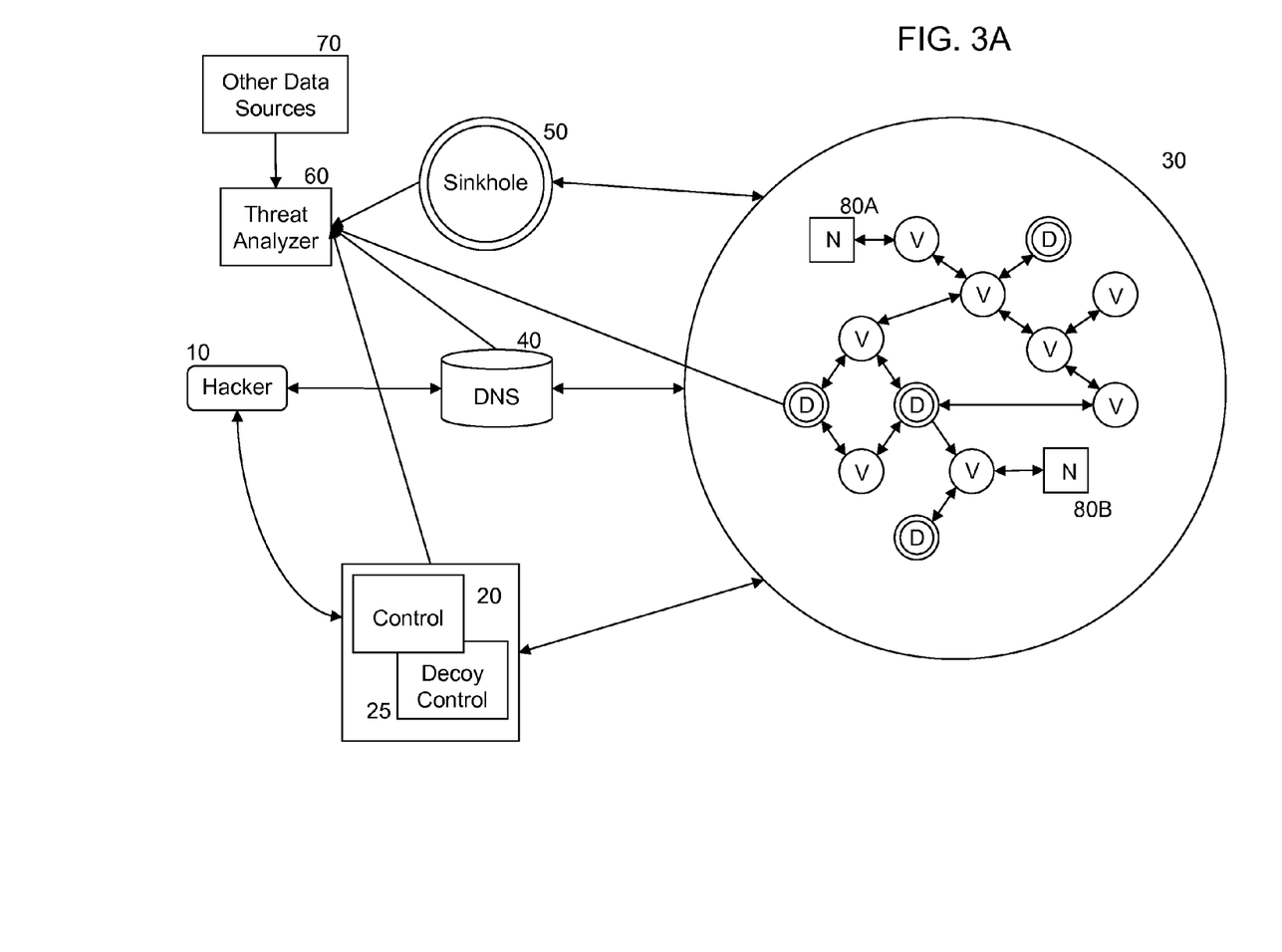
FIGS. 3A and 3B are exemplary system diagrams that illustrates the detection of a compromised computer within a network according to an embodiment of the present invention.
Figure 3B:
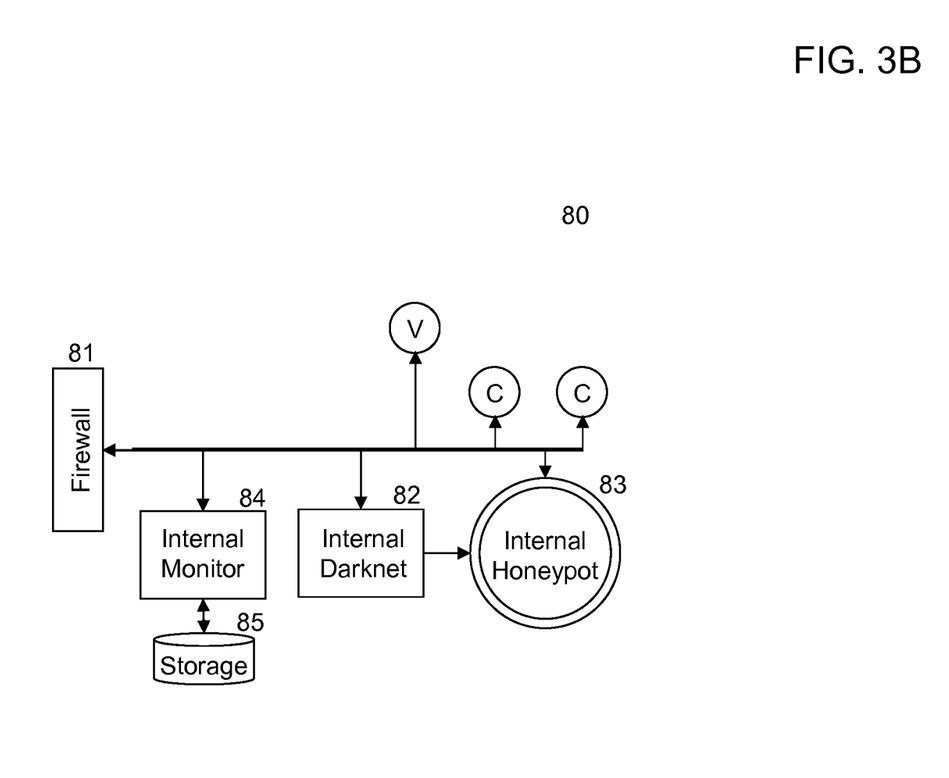

FIGS. 3A and 3B are exemplary system diagrams that illustrate the detection of a compromised computer within a network. Like FIG. 2, FIG. 3A shows a system that can be used for detecting network compromise, but includes networks 80A and 80B within victim cloud 30. FIG. 3B further illustrates the detection of a victim computer within a network 80, such as a corporate network.

As shown in FIGS. 3A and 3B, one or more victim computers V are located within networks 80A and/or 80B. Additional victim computers may also exist within the countless networks connected to the Internet. Each network 80 may also include a firewall 81, internal darknet 82, internal honeypot 83, and internal monitor 84.

In this exemplary embodiment, one or more computers located within a network 80 become infected by malware and thereby become victim computers V. Other computers C within the network 80 may remain unaffected by the malware. The computer network 80 may be protected by various security elements, such as firewall 81 and anti-virus software installed on individual network computers and other network elements, but the victim computer V is infected by malware despite the precautions provided by the security elements. Once the malware successfully circumvents the security elements of the network 80, malware typically attempts to infect other machines within the infected network 80.

To attack additional devices located in network 80, the malware may use victim computer V to access and infect devices located at one or more IP addresses on the network 80. Several IP addresses are available to the network 80. In addition to the IP addresses that are assigned to connect servers, firewalls, computers, and the like, the network 80 also includes a number of IP addresses that are not being used and should not be accessed. Some of the unused IP addresses can be dedicated to an internal darknet 82.

A darknet is a block of IP addresses that do not generate any traffic. Ordinarily, networks are configured to generate error messages when an unused IP address is accessed. However, the IP addresses dedicated to a darknet do not produce any traffic at all, including error messages. The internal darknet 82 is a computer or network security element assigned to a block of IP addresses that would not otherwise be used by the network 80. Because the IP addresses of darknet 82 are designated as unused by the network 80, computers within the network 80 have no legitimate reason to access the darknet 82. Traffic attempting to access an unused IP address of the darknet 82 can be immediately identified as malicious. In particular, the malware that has infected victim computer V is scanning through IP addresses of the network 80 so that additional computers can be infected. Malware typically iterates through blocks of IP addresses in an attempt to infect other computers within the network 80. Because the hacker 10 has few means for knowing which IP addresses are used or unused, the malware typically iterates through IP addresses, accumulating victims along the way.

When victim computer V attempts to access an unused IP address of the internal darknet 82, traffic from the victim computer V is redirected to honeypot 83. A honeypot is a network element or computer that imitates the operation of the network 80 and analyzes the traffic of victim computer V in order to better understand the malware that has infiltrated the network 80. One or more honeypot computers are located at IP addresses that would not otherwise be used by the network 80. The internal darknet 82 redirects traffic from a victim computer V to the honeypot 83 so that the malware can be analyzed.

The network 80 optionally includes internal monitor 84. An internal monitor 84 is a computer that gathers threat data within a network 80. For example, the internal monitor gathers threat data from the internal honeypot 83 and victim computers V located within the network 80. The threat data gathered by the internal monitor 84 can be sent to the threat analyzer 60 to be analyzed in combination with other threat data.

The internal monitor 84 is connected with the internal darknet 82 and internal honeypot 83. Once a victim computer V is identified, internal monitor 84 may initiate a full-packet capture to store all data traffic of the victim computer V. The full-packet capture is stored at storage unit 85. Using the captured data, the internal monitor 84 performs network behavior analysis including netflow analysis, anomaly detection, and signature correlation. In addition, traffic of the victim computer V within network 80 is redirected to internal monitor 84 such that it is prevented from communicating with the control computer 20 such that the loss of data to a hacker is prevented.

Figure 4:
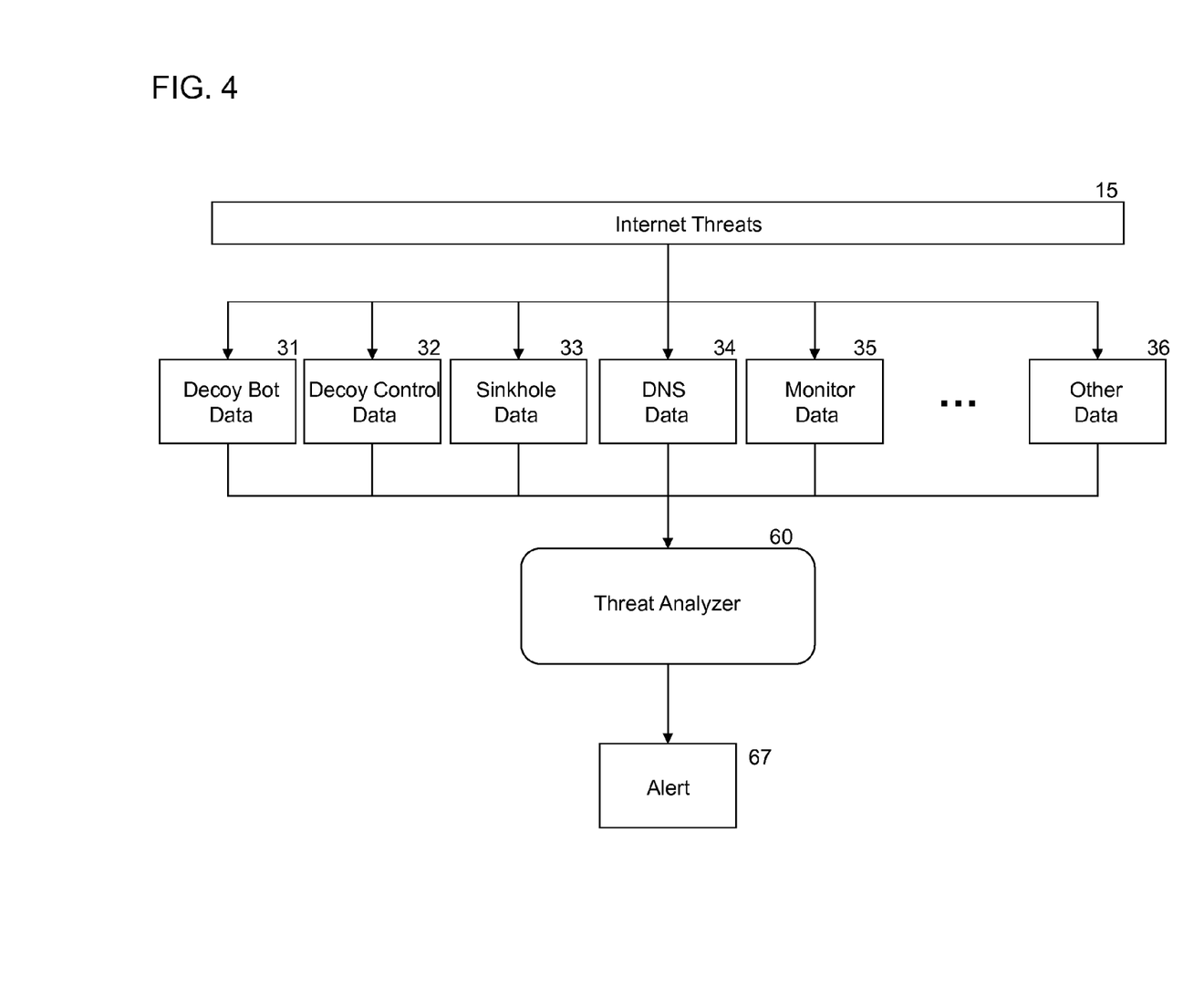
FIG. 4 is an exemplary flow diagram that illustrates the aggregation of a plurality of threat indicators from a plurality of sources according to an embodiment of the present invention.

FIG. 4 is an exemplary flow diagram that illustrates the aggregation of a plurality of threat indicators from a plurality of data sources according an embodiment of the present invention. As shown in FIG. 4, hackers continually promulgate Internet threats 15, such as malware. To assess these Internet threats, the threat analyzer 60 gathers information from a plurality of sources 31-36. The data includes decoy bot data 31, decoy control computer data 32, sinkhole data 33, DNS data 34, monitor data 35, and other data 36.

Decoy bot data 31, decoy control computer data 32, sinkhole data 33, and monitor data 35 are subjected to packet inspection to locate stolen information. The identification of stolen information indicates that an attack has occurred. Packet inspection may be performed at either the devices themselves or at the threat analyzer 60. In either case, if stolen data is located, the threat analyzer 67 generates an alert 67 so that the rightful owner is identified and alerted so that remedial action can be undertaken.

DNS data 34 is analyzed to identify control computers 20. As discussed above, the request rate of a domain name or subdomain name is used to determine whether a computer is suspicious and likely to be a control computer. The request rate of a particular domain and other data is collected by the DNS or DNS server 40. In addition, DNS data is analyzed to determine whether a DNS server's cache has been poisoned.

The threat analyzer 60 also gathers internal monitor information 35 corresponding to data collected from the internal monitors 84 of its customers. With the threat data of a plurality of customer networks, threat information of one customer network can be used to assist a second customer network. After an internal monitor 84 performs network behavior analysis including netflow analysis, anomaly detection, and signature correlation, the results of the each internal monitor 84 may be analyzed in combination. Within the threat analyzer 60, the internal monitor data 35 of each customer can be made anonymous. In other words, information identifying a particular customer network can be removed when being used to analyze other customer networks. After being made anonymous, the internal monitor data 35 of each customer may be combined with internal monitor data 35 of other customers that has also been made anonymous. In this manner, the internal threat data of one customer may be used to assist other customers. For example, if one customer is subjected to an attack of a new malware, the internal monitors 84 of other customers are updated to more quickly identify the attack.

In addition, the threat analyzer 60 gathers information from a plurality of other sources 36. Additional data sources will now be described. Of course, the additional data sources described are exemplary and are not intended to be an exhaustive listing of all possible data sources.

A security provider may maintain automated end users throughout the Internet to visit the websites its customers and test whether the websites function properly. The automated end users act as virtual machines to visit the websites in the same way that an ordinary user would visit the sites. The automated end users collect and log data about the website load, such as load time, whether all parts the site loaded properly, and whether there were any errors. By comparing historical data about these sites with present experiences, the security provider is able to set a baseline for "normal" site load activity as well as "loss paths" (where information is either dropped or misdirected during a site load) and then detect anomalies that could be indicative of a problem with the site or of malicious interference with the site.

A security provider may also map IP addresses to physical locations. The physical location of an IP address may be used to physically locate a known control computer 20. In addition, when a decoy control computer 25 is communicating with a hacker 10, a security provider may use the IP address of the hacker 10 stored within the decoy control computer 25 to physically locate the hacker 10.

A security provider can determine the physical location of an IP address by triangulating the physical locations of IP addresses by pinging the IP address from different locations around the world to measure the time-to-return in order to establish the approximate location of the computer or server assigned the particular IP address. A security provider may also rely on information from entities, such as merchant websites, who have correlated IP addresses with shipping address information.

A security provider may also employ registry data to locate hackers 10 using domain names. Registry data consists of data that domain name registrants provide to the registrar when they obtain a domain name. This is the data that is entered in to the "WhoIs" record. A full set of registry data could contain the name, address, phone and fax number, and email address for the registrant, the technical contact, and the administrative contact associated with the domain. This data would include payment information that the registrar has on file for the registrant and the name server associated with the domain name. The WhoIs record also contains a historical record of all past and present registrants along with the dates and times the registrants registered the domain.

A security provider may also use data associated with the enforcement of its internal network security policies, such as the internal Internet filters and rules relating to the downloading and installing external files and programs. A security provider may also use packet inspection techniques to collect and analyze traffic on its own network. For example, Internet filters are used to detect and block employees from visiting unauthorized sites or sites known to be infected with malware. The data associated with positive filtering activity is captured and logged. After being logged, the security provider's internal data may be used to prevent computers within customer networks from visiting unauthorized sites or sites known to be infected with malware.

A security provider may also obtain routing data. In other words, routing probe software determines what routes are being announced on the Internet at any given time for a particular IP address. Routing probe software employs packet probes around the Internet that deliver routine information and traceroute information which identify latency and packet loss. False route announcements associated with a customer's domain name or IP address are an early indicator of data loss.

The plurality of sources 31-36, such as the decoy victims V, decoy control computers 25, sinkhole computer 50, internal monitor 84, may be implemented as a computer. Accordingly, each of the plurality of data sources includes a central processing unit (CPU), a random access memory (RAM), a storage unit, and one or more input/output (I/O) devices. Additional storage devices may also be used as needed.

In addition, the plurality of sources may communicate security information to the threat analyzer 60 in any format including log entries, event logs, access logs, application logs, network statistics, packet inspection alerts, etc. The format of the security information may depend on the data source.

Figure 5:
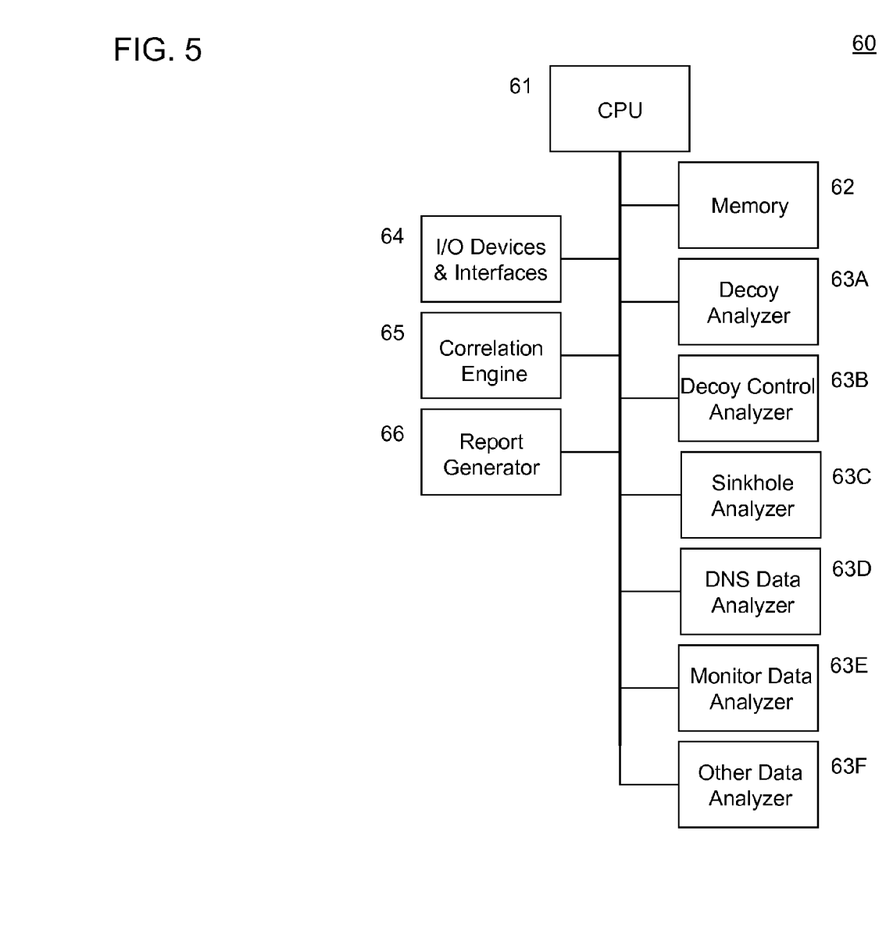
FIG. 5 is an exemplary block diagram that illustrates the threat analyzer according to an embodiment of the present invention.

FIG. 5 is an exemplary block diagram that illustrates the threat analyzer 60 according to an embodiment of the present invention. The threat analyzer 60 is a computer having several hardware and software components that implement its functions. In particular, the threat analyzer 60 includes CPU 61, memory 62, data analyzers 63, input/output (I/O) devices 64, correlation engine 65, report generator 66, and database 69.

The CPU 61 and memory 62 may be conventional hardware components of a computer. The CPU 61 and memory 62 can be utilized by other components of the threat analyzer 60, the components communicating over a conventional communications bus or other communications means.

The input/output (I/O) devices 63 receive information from a plurality of external data sources. The I/O devices 63 also transmit information to the appropriate analysis component within the threat analyzer 60. Of course, the I/O devices 63 also contain the interfaces necessary to communicate with external data sources as well as components internal to the threat analyzer 60. The I/O devices 63 use one or more communications ports of the threat analyzer to communicate with external data sources. External data sources may communicate with the threat analyzer 60 may occur over the Internet using sockets, ports, and other conventional devices.

Several data analyzers 64 include a decoy bot analyzer 64A, decoy control analyzer 64B, sinkhole analyzer 64C, DNS data analyzer 64D, monitor data analyzer 64E, and other data analyzers 64E. The correlation engine 65 includes behavioral analysis algorithms that aggregate the gathered data into a combined dataset. The combined dataset is analyzed by the correlation engine 65 to generate threat indicators.

As described above, the threat analyzer 60 aggregates security threat indicators from a plurality of sources and analyzes threat indicators as a synergistic combination. According to an embodiment of the present invention, the threat analyzer 60 gathers information from a plurality of sources and networks in order to reduce the impact of security breaches on individual networks.

As illustrated in FIG. 5, the threat analyzer 60 includes a correlation engine 65 that executes behavioral analysis algorithms. The behavioral analysis algorithms monitor data from the plurality of data sources to establish expected behaviors of individual devices. Individual devices include any device, the behavior of which is being captured by one or more of the plurality of data sources. For example, the behavior of DNS servers 40 is captured by DNS data 34, and the behavior of computers being monitored by internal monitor 84 is captured by monitor data 35. If a device deviates from its expected behavior, then the unexpected behavior of that device is a possible indicator of a threat. The unexpected behavior of the device combined with other events, that may otherwise be innocuous, can further indicate that a security event is imminent or has already occurred.

Data analyzers 63 analyze the behavior of the devices they monitor. Once a baseline of expected behavior is established for a device, incoming data is monitored to determine whether the device is acting in a way that is consistent with its expected behavior. As the dataset for a particular device grows, behavior that is considered expected may change over time. Accordingly, the behavioral analysis techniques of the present invention are dynamic as they adapt over time with changes in the data.

The threat analyzer 60 also includes a database 69 that stores the expected behavior of the devices being monitored. As will now be explained, the determination of whether a particular behavior is expected may be a manual or an automated process, or a combination of manual and automated processes. An exemplary manual process will first be discussed, followed by the exemplary automated process.

The traffic of a device can be reviewed and evaluated by a security analyst to identify possible unexpected behavior. To determine whether a particular behavior is unexpected, the security analyst can develop a behavioral profile associated with the device. The host of the device may be requested to provide information useful for defining expected behavior for that device. When evaluating behavioral data, the security analyst considers the user's job description, geographical location, typical work hours, etc. As will be understood, expected behavior of a particular device may change over time and may be defined iteratively through one or more communications between a security analyst and the host of the device.

As an example, consider a user's computer within a company's network that has never before communicated with computers located in foreign country "X". The user's computer may have no reason to connect with a computer in country "X". In contrast, a different user may frequently connect with a computer in country "X" because of that different user's job description. In this example, if the first user's computer communicates with a computer in country "X," the traffic of that employee's computer would be considered suspicious, whereas the same activity by the second user's computer should not raise suspicion. In this example, the database 69 can be manually programmed by a security analyst to identify expected behaviors of the two employees. As can be appreciated from this example, communication between a security analyst and an IT professional of the company whose devices are being monitored would help resolve whether behavior is expected for particular devices.

Determining whether particular data traffic is expected may also be determined via an automated process. A software update is an example of data traffic that can be automatically identified as expected behavior. For example, if each computer within a company's network connects to the IP address of a known software provider at a particular time, then the data traffic is considered expected because it is likely to be a software update for a commonly used program. In this example, the database 69 can be programmed to automatically recognize this data traffic as expected. As software providers change their update schedules, the expected behavior of a particular device may change over time in accordance with the changes to the schedules.

Unexpected behavior is a possible indicator of a security event. When a data analyzer 63 identifies a possible indicator of a security event, the threat analyzer 60 invokes correlation engine 65 and generates a session of interest. Once a session of interest is established, the behavioral analysis algorithms of the correlation engine 65 look for additional indicators that would further indicate that a security event has occurred. The correlation engine 65 can receive additional data from any of the data analyzers 63. The correlation engine 65 combines the data received from the plurality of data sources and correlates it to identify additional indicators of a security event. When there is sufficient indication of a security event, the session of interest is changed to a session of concern. Once a session of concern is generated, the threat analyzer 60 invokes report generator 66 to notify a customer that a security event has occurred. Thus, by using correlated data, the correlation engine 65 can determine whether a security event has occurred.

An example of using a combination of indicators to identify a security event will now be provided. If computer within network 80 accesses an IP address in a foreign country for the first time, that event may be innocuous, but may also be an indicator of a security event. Here, the expected behavior of the computer is to connect only to domestic computers. Accordingly, the connection to a computer located in a foreign country is an unexpected event that triggers a session of interest. Additional unexpected behaviors by the computer would further indicate the occurrence of a security event. If the computer then connects to an unusual website (e.g., a banking computer connecting to website for fertilizers that can also be used to make explosives), the correlation engine 65 further identifies this event as suspicious and as an indicator of a threat. If the computer then connects to a known control computer 20, which is another threat indicator, the session of interest may be raised to a session of concern. Individually, each of these events may not have been sufficient to indicate a threat, but when combined indicate a strong likelihood of a security event. Accordingly, the network 80 hosting the computer is notified of the security event.

In another example, the mere connection of a computer to a known control computer 20 may trigger a session of interest, but may not be sufficient to indicate that a security event has occurred. Here, a hacker 10 may be using a malicious subdomain of an otherwise non-malicious website. However, the connection of a computer to a known control computer 20 combined with the scanning of an internal darknet 82 by the computer may be sufficient to warrant a session of concern.

In yet another example, DNS data of a plurality of DNS servers 40 can be used to identify a network attack. If one DNS server 40 returns an incorrect IP address (e.g., 6.6.6.6) in response to a DNS lookup of www.example.com, that event may be innocuous. However, if several other DNS servers 40 also return the same incorrect IP address, then the domain www.example.com is likely being attacked.

In some instances, a single event is sufficient to identify a security event. As an example, identifying stolen information in a decoy device is a clear indicator of a security event.

The behavioral analysis techniques of the present invention are advantageous compared to conventional signature correlation techniques.

Behavioral analysis techniques are effective against zero-day attacks. Prior art signature correlation techniques rely upon a library of signatures corresponding to bandwidth traffic patterns of known attacks. Accordingly, the signature correlation library needs to be updated when new malware identified. By contrast, behavioral analysis techniques detect unexpected behaviors that indicate a likelihood of a security event. Because behavioral analysis techniques identify unexpected behaviors that indicate a possible threat, they are not only effective against known attacks, but zero-day attacks as well.

In addition, behavioral analysis techniques are dynamic and adaptive. As the data of the plurality of data sources changes and grows, the behavioral analysis algorithms can modify the expected behaviors of individual devices. As described above, conventional signature correlation techniques rely upon a pre-determined library. By contrast, the behavioral analysis techniques change in real-time as the data of the plurality of data sources also changes.

When a security event is identified by the correlation engine 65, report generator 66 generates and sends a report identifying the security event to the system administrator the compromised network. Alternatively, remedial action may be taken by a security provider and merely reported to the system administrator of the compromised network. For example, if a DNS server 40 returns a false IP address in response to a DNS query, i.e., DNS poisoning, a security provider may contact the DNS service provider so that the DNS table within DNS server 40 is corrected.

Figure 6:
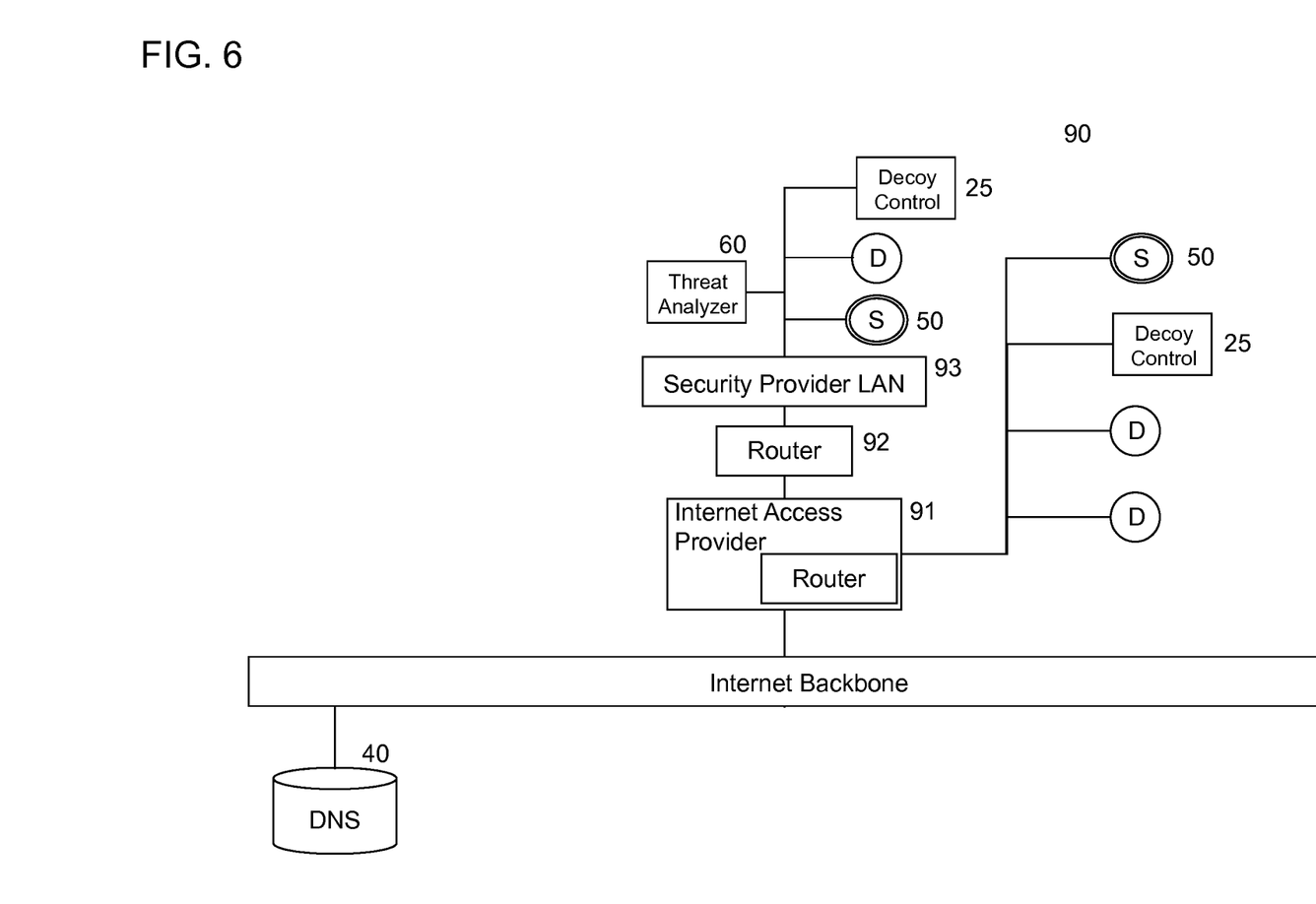
FIG. 6 is an exemplary system diagram that illustrates an exemplary network of a security provider that hosts decoy devices according to an embodiment of the present invention.

FIG. 6 is an exemplary system diagram that illustrates an exemplary network of a security provider that hosts decoy devices according to an embodiment of the present invention. As shown in FIG. 6, the security provider network 90 includes Internet access provider 91, router 92, security provider local area network (LAN) 93, sinkhole 50, threat analyzer 60, decoy control computer 25, and decoy device D. The system illustrated in FIG. 6 is exemplary and not limited to any particular network structure.

Using a connection to the Internet, the threat analyzer 60 gathers security information from a plurality of external sources as described above. In addition, the threat analyzer 60 gathers data from a plurality of internal sources such as decoy victims D, decoy control computers 25, and sinkhole 50. The internal data sources may be hosted within the security provider LAN 93. Alternatively, the internal data sources may be hosted by the security provider's Internet access provider 91.

It will be apparent to those skilled in the art that various modifications and variations can be made in the improved method and apparatus for detecting network compromise of the present invention without departing form the spirit or scope of the invention. Thus, it is intended that the present disclosure cover such modifications and variations of this invention.

What is claimed is:

1. A method for detecting an attack on a network of victim computers in a victim cloud that connect to one or more Domain Name System (DNS) or Dynamic Domain Name System (DDNS) servers, comprising:
   operating one or more decoy bot computers in the victim cloud;
   operating one or more decoy control computers among one or more control computers that communicates with one or more victim computers and decoy bot computers in the victim cloud;
   identifying threats by analyzing data traffic communicated with the one or more victim computers, the one or more decoy bot computers and the one or more decoy control computers; and
   upon identifying information suspected of being stolen by a hacker,
      if the identified information was identified from a victim computer from among the one or more victim computers in communication with a control computer used by the hacker, modifying a lookup table in a DNS or DDNS server from among the one or more DNS or DDNS servers to replace an Internet Protocol (IP) address for the control computer with an Internet Protocol (IP) address for a sinkhole computer for connecting the victim computer to the sinkhole computer; and
      if the identified information was identified from a decoy bot computer from among the one or more decoy bot computers or a decoy control computer from among the one or more decoy control computers, intercepting a transmission and removing data suspected of being stolen from the data traffic while maintaining ongoing communications between the decoy control computer or the decoy bot computer and the hacker.

2. The method of claim 1, further comprising:
terminating the control computer upon identifying information transmitted by the control computer that is suspected of having being sent from the victim computer to a hacker.

3. The method of claim 2, further comprising:
upon terminating the control computer through which the victim computer was communicating with a suspected hacker, connecting the victim computer to a sinkhole;
subjecting traffic routed through the sinkhole to packet inspection; and
correlating results of the packet inspection with threat data obtained from other sources to analyze the likelihood that the victim computer has been compromised.

4. The method of claim 1, further comprising:
terminating a DNS server in communication with the control computer upon identifying information transmitted by the control computer that is suspected of having being sent from the victim computer to a hacker.

5. The method of claim 4, wherein when DNS servers are terminated, monitoring a request rate for a next domain name or subdomain name by a control computer to determine whether the control computer is suspicious.

6. The method of claim 1, wherein a plurality of victim computers in the victim cloud operate within a corporate network that includes an internal threat monitor,
   and wherein the step of identifying threats additionally comprises analyzing threat data communicated by the internal threat monitor.

7. The method of claim 6, wherein a plurality of corporate networks that include internal threat monitors are included in the victim cloud,
   and wherein the step of identifying threats additionally comprises analyzing threat data communicated by the internal threat monitors.

8. A system for detecting an attack on a network of victim computers in a victim cloud that connect to one or more Domain Name System (DNS) servers, comprising:
   at least one decoy bot computer in the victim cloud;
   at least one decoy control computer operating among one or more control computers that communicates with one or more victim computers and decoy bot computers in the victim cloud; and
   a threat analyzer in communication with the at least one decoy control computer, the at least one decoy victim computer, and a sinkhole computer,
   wherein the threat analyzer (i) identifies threats by analyzing data from the sinkhole computer and data traffic communicated with the at least one decoy bot computer and the at least one decoy control computer for information suspected of having been sent from a victim computer from among the one or more victim computers, without proper authorization, and (ii) intercepts transmissions and removes data suspected of being stolen, from the data traffic, while maintaining ongoing communications between the at least one decoy control computer or the at least one decoy bot computer and a hacker that uses a control computer from among the one or more control computers, wherein the victim computer is connected to the sinkhole computer upon identifying the information as having been sent from the victim computer and modifying a lookup table in a DNS server from among the one or more DNS servers to replace an Internet Protocol (IP) address for the control computer with an Internet Protocol (IP) address for the sinkhole computer.

9. The system of claim 8, wherein the threat analyzer is additionally in communication with at least one DNS server and monitors whether behavior of the DNS server deviates from expected behaviors.

10. The system of claim 8, wherein the threat analyzer terminates the at least one decoy control computer upon identifying information transmitted by the at least one decoy control computer that is suspected of having being sent from the victim computer to a hacker.

11. The system of claim 10,
wherein a victim computer is connected to the sinkhole upon terminating the control computer through which the victim computer was communicating with a suspected hacker.

12. The system of claim 8, wherein the threat analyzer terminates a DNS server in communication with a control computer is upon identifying information transmitted by the control computer that is suspected of having being sent from the victim computer to a hacker.

13. The system of claim 8, wherein a plurality of victim computers in the victim cloud operate within a corporate network that includes an internal threat monitor, and the threat analyzer analyzes threat data communicated by the internal threat monitor.

14. The system of claim 13, wherein a plurality of corporate networks that include internal threat monitors are included in the victim cloud, and the threat analyzer identifies threat data communicated by the internal threat monitors.

15. The system of claim 8, wherein the threat analyzer further includes a correlation engine.

16. The system of claim 8, further comprising a report generator that notifies owners of victim computers upon determination by the threat analyzer that an intrusion potentially has occurred.

* * * * *